US012358009B2

(12) United States Patent
Brown et al.

(10) Patent No.: US 12,358,009 B2
(45) Date of Patent: Jul. 15, 2025

(54) BEZEL ADJUSTMENT FOR EXTERNALLY ACCESSIBLE THROTTLING VALVE

(71) Applicant: The Fountain People, Inc., San Marcos, TX (US)

(72) Inventors: Kevin Thomas Brown, Mountain City, TX (US); David Olvera, Kyle, TX (US)

(73) Assignee: THE FOUNTAIN PEOPLE, INC., San Marcos, TX (US)

( * ) Notice: Subject to any disclaimer, the term of this patent is extended or adjusted under 35 U.S.C. 154(b) by 22 days.

(21) Appl. No.: 16/405,148

(22) Filed: May 7, 2019

(65) Prior Publication Data

US 2020/0353490 A1 Nov. 12, 2020

(51) Int. Cl.
*B05B 12/00* (2018.01)
*B05B 1/30* (2006.01)
*B05B 17/08* (2006.01)

(52) U.S. Cl.
CPC ............ *B05B 12/002* (2013.01); *B05B 1/304* (2013.01); *B05B 17/08* (2013.01)

(58) Field of Classification Search
CPC ........ B05B 1/304; B05B 12/002; B05B 17/08
See application file for complete search history.

(56) References Cited

U.S. PATENT DOCUMENTS

| | | | | |
|---|---|---|---|---|
| 1,724,662 | A * | 8/1929 | Johnson | B05B 1/265 239/457 |
| 3,589,616 | A * | 6/1971 | Stephens | B05B 15/74 239/204 |
| 4,189,099 | A * | 2/1980 | Bruninga | B05B 1/12 239/582.1 |
| 4,408,721 | A * | 10/1983 | Cohen | A61H 33/027 411/432 |
| 5,095,558 | A * | 3/1992 | Howard | A61H 33/6063 4/559 |
| 9,027,848 | B1 * | 5/2015 | Hilton | E04H 4/14 239/17 |
| 9,315,974 | B2 | 4/2016 | Brown et al. | |
| 2011/0272498 | A1 * | 11/2011 | Li | B05B 15/654 239/583 |
| 2019/0351339 | A1 | 11/2019 | Stoks et al. | |

OTHER PUBLICATIONS

Canadian Office Action Appln No. 3,080,217 dated Oct. 31, 2023.

* cited by examiner

*Primary Examiner* — Jason J Boeckmann
(74) *Attorney, Agent, or Firm* — McAndrews, Held & Malloy, Ltd.

(57) ABSTRACT

Embodiments of the present disclosure relate to water fountain structures, and more specifically relate to modular fountain structures that include an adjustment bezel for changing a flow of water via an adjustable valve housed within them fountain structure. Adjustments to the valve to adjust the flow of water are effected by accessing the valve at the site of the fountain structure. The adjustment bezel or other manipulable device is incorporated with each fountain structure to provide control for flow of water emitted from the fountain, as the adjustment bezel is accessible without removal and/or disassembly of the fountain structure.

20 Claims, 5 Drawing Sheets

BEZEL ADJUSTMENT FOR EXTERNALLY ACCESSIBLE THROTTLING VALVE

BACKGROUND

A variety of water fountain systems that are capable of varying a velocity and pattern of a water stream are known. Known water fountain systems may provide entertaining water displays, including those choreographed to music or associated light displays. Individual control of water streams from each fountain to create dynamic water displays is difficult, for example, when multiple fountains are embedded in pavement and provided water from a central location. These issues are compounded, as some fountain systems are quite elaborate, for example by incorporating synchronized water effects, lights, and sound features. As fountains have become more elaborate, the initial installation and maintenance, as well as expansion and modification of existing fountains, has become correspondingly complex.

Embodiments of the present invention are directed toward an improved fountain structure that, among other improvements, is designed to change fluid flow through a central axis of the structure by employing an adjustment bezel that is mechanically coupled to an adjustable valve, thereby allowing water flow adjustments at the fountain structure location.

SUMMARY OF THE INVENTION

Embodiments of the present disclosure relate to water fountain structures, and in preferred embodiments, more specifically relate to modular fountain structures that include an adjustment bezel for changing a flow of water via an adjustable valve housed within the fountain structure, with advantages for installation, service, expansion, and modification of the water fountain structure within a water fountain system(s).

An example fountain can be installed below pavement grade level, with the fountain output (i.e. nozzle) positioned at grade level. For instance, a plurality of fountain structures can be installed below grade, flush with an expanse of paving such as a park, to create an array of fountains in a water feature. In such an installation, water is pumped to the fountain through conduits below grade level.

Often, adjustment to one or more fountain structures is needed to create a desired effect, such as a change in the flow of water through a given fountain structure. However, in conventional systems, valves to modify the flow of each fountain are located at the source of water, such as a maintenance and control area. Accordingly, any adjustment to the flow of a fountain required an operator to leave the fountain area to make adjustments to a respective valve, or would require multiple operators (i.e. one to effect the adjustment at the control room, and one to view the result of the adjustment at the fountain area).

Advantageously, the presently disclosed fountain structure provides an adjustable valve within a housing. Therefore, an operator is able to make adjustments to the valve to change the flow of water by accessing the valve at the site of the fountain structure. As described with respect to the several figures, an adjustment bezel or other manipulable device is incorporated with each fountain structure to provide control for flow of water emitted from the fountain. Advantageously, the adjustment bezel is accessible without removal and/or disassembly of the fountain structure. Also, regulation of water flow at the given fountain structure is possible with both a shared water source (e.g., from a common input, reservoir, etc.) and a dedicated water source (e.g., individual conduits provided for each fountain structure).

In some embodiments, a fountain structure includes a housing for placement within an opening (e.g., within a paved area). A cover encloses the housing within the opening, the cover having an exposed surface when enclosing the housing. An adjustable valve is configured to change a flow of fluid from the fountain structure, the valve being enclosed within the housing. An adjustment bezel includes a first portion and a second portion, the first portion at least partially exposed on the surface of the cover, and the second portion enclosed within the housing and configured to engage with the valve, where movement of the bezel causes a change in the valve to change the flow of fluid.

In disclosed embodiments, the valve is threadably engaged with the second portion of the bezel at a first end of the valve and threadably engaged with a fluid inlet at a second end of the valve. For example, the valve includes a throttle that is configured to change flow of the fluid based on a position of the valve relative to the throttle.

In some embodiments, the first portion of the bezel is configured to rotate about a central axis of the fountain structure, wherein rotational movement of the first portion of the bezel causes the valve position to change relative to the throttle to change the flow of the fluid. In some examples, the bezel and the valve are substantially cylindrical.

In disclosed embodiments, a nozzle is located at the output of the valve, the nozzle configured to direct the fluid flowing from the valve in a predetermined pattern. In some examples, the nozzle, the bezel, the cover, and the valve are aligned with the central axis.

In some disclosed embodiments, the opening is recessed within an underlying structure (e.g., pavement) such that the exposed surface of the cover is mounted flush with a surface of the underlying structure when enclosing the housing.

In an aspect of the present disclosure, the first portion of the bezel is manually rotatable or rotatable by employing a tool. For examples, the first portion of the bezel may include one or more mating features configured to facilitate rotation via the tool.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Figure 1:
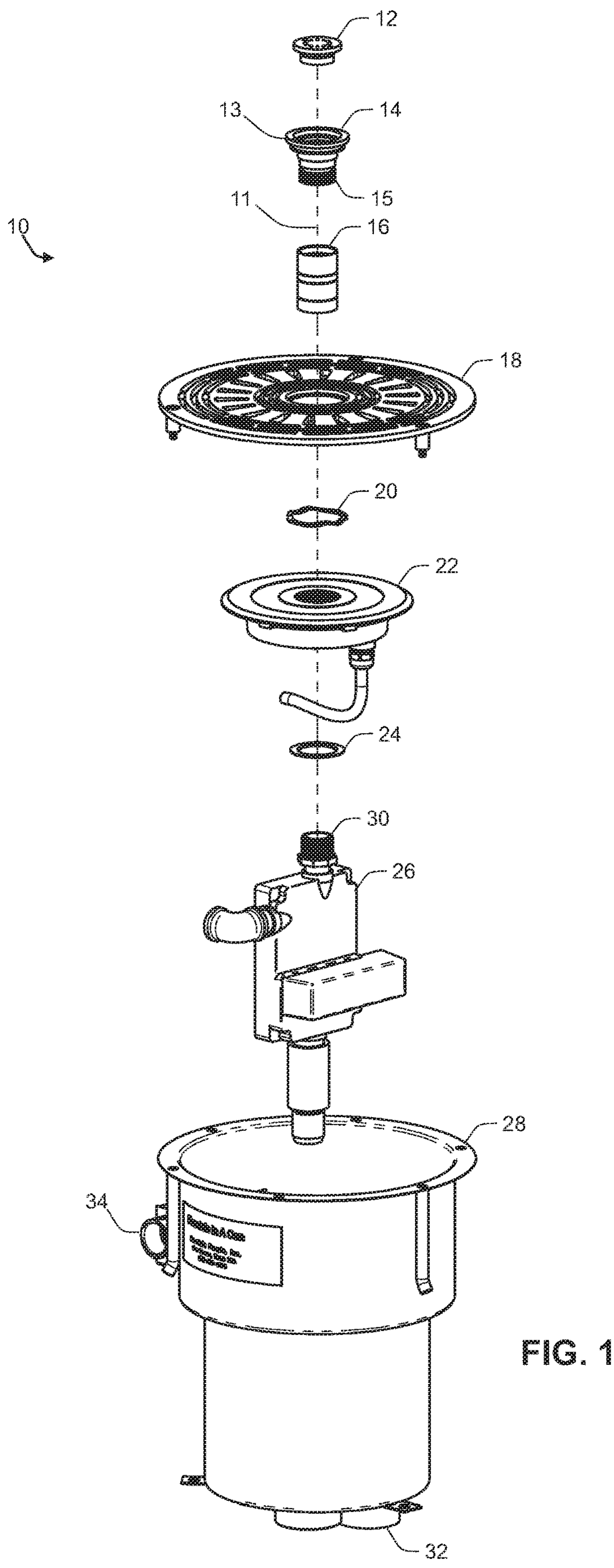
FIG. 1 is an exploded perspective view of an embodiment of a fountain structure of the present disclosure.

FIG. 1 is an exploded perspective view of an embodiment of a fountain structure 10. As can be seen in FIG. 1, embodiments of the fountain structure 10 described herein can include multiple components within a single enclosure or housing 28. In some embodiments, a nozzle 12 can be inserted into an adjustment bezel 14, which is engaged (e.g., connected, mated by threads, etc.) with an adjustable valve 16 via a lower or second portion 15 of the bezel 14. The nozzle, bezel and valve are aligned with a central axis 11 of the structure, which runs through a cover 18, an adjustment bezel retaining ring 20, a light effect assembly 22, a light effect retaining ring 24, a switch valve assembly 26, all of which are configured to be enclosed within housing 28 when assembled.

Upon installation, such as in an opening in a landscaped area covered with pavement, a surface of the cover 18 remains exposed at grade level. In some embodiments, a first portion 13 (e.g. a flange or annular protrusion) of the adjustment bezel 14 is also exposed. For example, the first portion 13 may rest upon the exposed surface of the cover 18. In some embodiments, the first portion 13 is arranged below the cover 18, yet accessible through an aperture in the cover 18, and/or by removing the cover 18 or a portion thereof. In some embodiments, the first portion 13 mates with the cover 18 such that the bezel 14 is rotatable. In this manner, as the bezel 14 rotates, the second portion 15 causes a rotation in the adjustable valve 16. The rotational movement can cause, in some examples, a change in position of the adjustable valve and/or a throttle (see, e.g., throttle 40 of FIG. 4), thereby changing the flow of water emitted from the nozzle 12.

Rotation of the adjustment bezel 14 and associated portions of the adjustable valve 16 can be implemented through clockwise and/or counterclockwise manipulation of the first portion 13 of the adjustment bezel 14. Further, when the nozzle 12 is attached to the structure 10, the design of the nozzle provides a pattern and configuration for spraying fluid, such as water, emitted from the nozzle 12. Although illustrated with a single nozzle, in some embodiments, the fountain structure may include more than one nozzles or opening through which water may flow. For instance, in some embodiments the fountain structure 10 may include multiple adjustable valves with dedicated nozzles, and/or may have multiple nozzles downstream from an adjustable valve.

With reference to FIG. 1, housing 28 is designed to be substantially hollow with a center opening dimensioned to enclose the various components within. The housing 28 is designed to be embedded in concrete or other paving materials. The housing 28 may include waterproof seals between the housing 28 and the surrounding earth/paving to prevent water from seeping into the surrounding environment. One or more inlet and/or outlet ports 32, 34 are provided for provision and/or drainage of water, electricity, control wires, etc., and configured for attachment to one or more conduits, each of which may provide a fluid-tight seal. For instance, conduits or water lines may comprise one or more nozzles or manifolds through which water may be delivered below grade from the conduits directly to the interior of the housing 28 via ports 32, 34. In some embodiments, therefore, the flow of water into the fountain structure 10 during filling may be completely concealed within the paving.

In some embodiments, sharing of one or more conduits (i.e. water lines, electrical power, communications, etc.) and manifolds between multiple fountain structures 10 allows the conduits to be run in a single trench (i.e. underground), or in consolidated line within concrete or other paving, rather than in separate, independently run conduits as is typical in conventional fountain installations. Thus, regulation of water flow from each fountain structure 10 is provided at the site by adjustment of the bezel 14, offering advantages in the installation and maintenance of each fountain structures 10 and arrays of fountains.

In some embodiments, the switch valve assembly 26 and light effect assembly 22 of the fountain structure 10 can be in communication with one or more controllers (or computer system) to control fluid flow, water, light and/or sound effects, for example, to synchronize the operation of the fountain with other fountains in the assembly, such as with a musical score.

In conventional systems, multiple tubes provide water from a central control. In order to change flow to a particular fountain, it would have to be identified at the central control and the change in the valve would be incremental guesswork and/or require multiple service people to properly change the water flow. Advantageously, the presently disclosed fountain structure 10 allows for water flow regulation at the location of the fountain, providing immediate feedback regarding adjustments.

In embodiments, it is also contemplated that the fountain structures 10 described herein can be submerged in a fluid (e.g., a pool of water), and retain the benefits of operation, installation and service.

Figure 2:
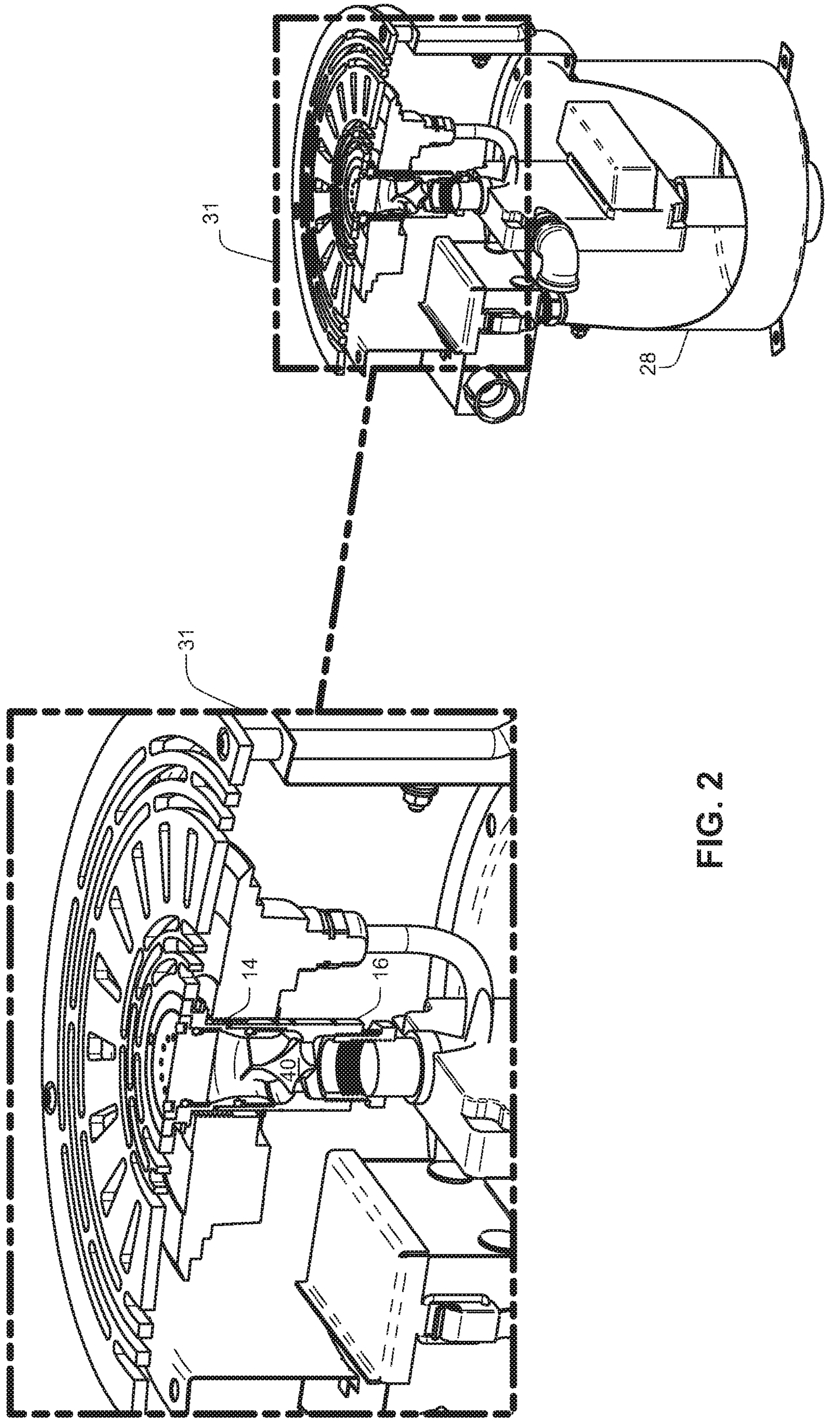
FIG. 2 is a perspective cut-away view of an embodiment of an assembled fountain structure of the present disclosure.

FIG. 2 is a perspective view of an embodiment of an assembled fountain structure 10, providing a detailed cut-away view 31 revealing connections between the bezel 14, valve 16, and an internal throttle 40. As described with respect to FIG. 1, movement of the bezel 14 causes a change in position of the valve 16 and/or the throttle 40. The change causes the throttle 40 to vary the water flow through the valve, thereby changing the effect of the water feature.

Figure 3:
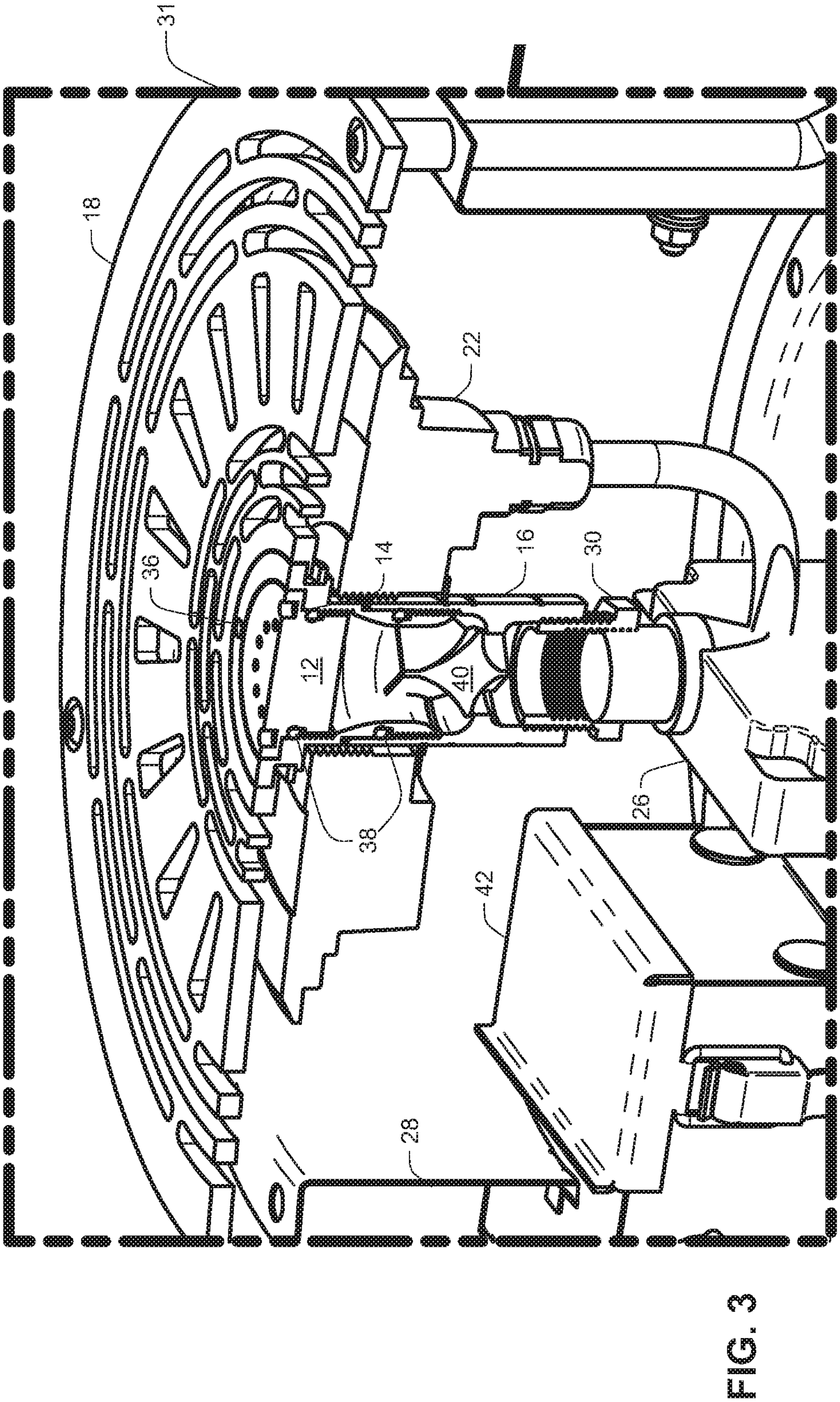
FIG. 3 is a detailed perspective cut-away view of an embodiment of an assembled fountain structure of the present disclosure.

A detailed view of the cut-away view 31 is shown in FIG. 3. In the illustrated embodiment, throttle 40 is located within valve 16 and aligned with the nozzle 12, bezel 14 and water outlet 30 of the switch valve assembly 26. As shown, bezel 14 may include one or more mating features 36, which allow for adjustment manually and/or use of a tool (e.g., a spanner wrench).

In some embodiments, rotating the bezel 14 in turn rotates the valve 16, causing the position of the valve 16 to change relative to the throttle 40. Throttling the valve 16 changes the flow of water, effecting the height, width, and/or volume of water flowing through nozzle 12. In examples, the adjustable valve 16 may be threadingly engaged with the threaded water outlet 30 of the switch valve assembly 26, which prevents the valve 16 from rotating with the bezel 14 during an adjustment operation. In some embodiments, rotation of the adjustment bezel 14 causes the valve 16 to turn, adjusting the vertical position of the valve relative to the throttle 40. The adjustment changes the amount of space between the valve 16 and the throttle 40, thereby changing the flow therethrough. Further, one or more internal gaskets 38 can be used to create fluid-tight seals between components.

In other embodiments, an interface between the bezel 14 and the cover 18 may comprise one or more marking and/or upward/downward protrusions, e.g., teeth or bumps, which indicate a number or degree of rotational movement during an adjustment operation.

In some embodiments, one or more conduits (e.g. water, electricity, etc.) described with respect to FIG. 1 can terminate in an internal enclosure 42, accessible upon removal of cover 18. The enclosure 42 can include a junction box for electrical connections, as well as valves or plugs for fluid flow, as needed.

In some embodiments, the cover 18 may be attached to the housing 28 by one or more fasteners, such that the cover 18 encloses the components within the housing 28 when assembled and reveals the components when removed. Further, the housing 28 can be arranged generally horizontal with the surface of the paving, with an upper end of the housing 28 generally flush with the grade level. In some embodiments, the paving may be laid level with the grade of the landscaping surrounding the housing 28, with each fountain structure 10 including components within the housing 28 below grade that include, for example, the adjustable valve 16, a light source, and/or sound speakers.

Although the cover 18 and associated components are illustrated as being generally circular, the cover 18 and associated components may take on any of a number of different shapes, such as rectangular, triangular, or any conceivable geometric shape. For instance, in some embodiments, the shape of the cover 18 (and fountain structure 10 generally) may be configured to fit a desired theme. Additionally or alternatively, the fountain structure 10 may be manufactured in a variety of sizes for different applications, while retaining the advantages disclosed herein.

Figure 4:
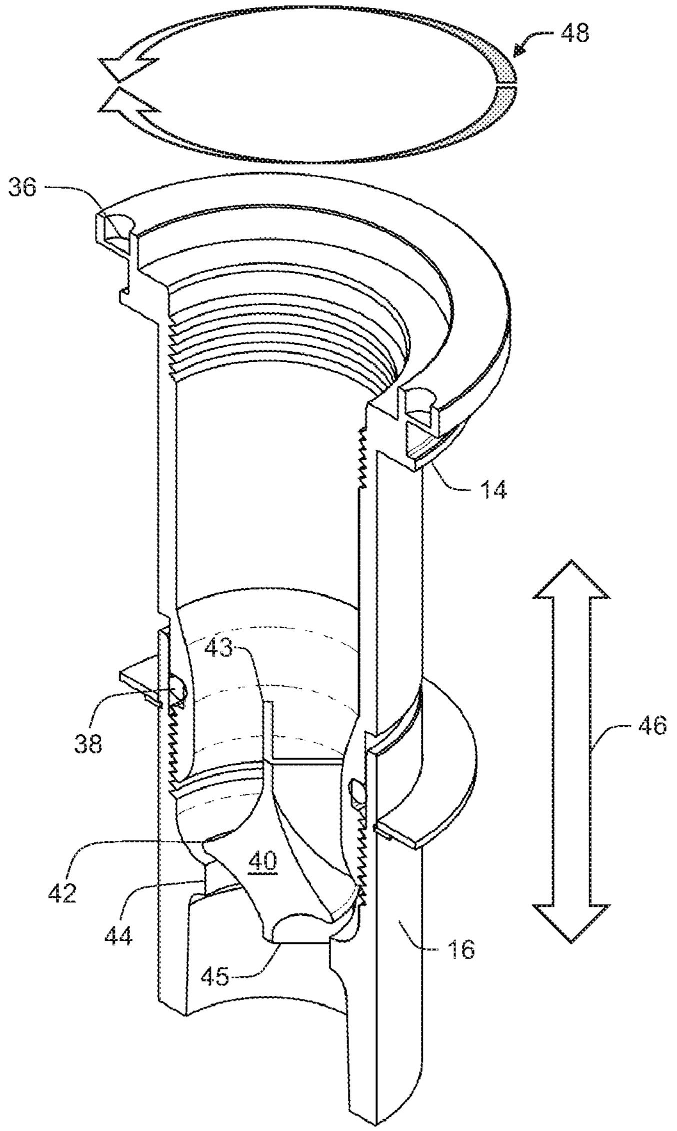
FIG. 4 is a perspective cut-away view of an embodiment of an adjustable bezel, an adjustable valve, and a throttle of an example fountain structure of the present disclosure.

FIG. 4 illustrates a detailed perspective view of an embodiment of the adjustable bezel 14, the adjustable valve 16, and the throttle 40. In some embodiments, as the bezel 14 is rotated clockwise or counterclockwise, as indicated by arrows 48, a position of the valve 16 moves vertically up or down relative to the throttle 40, as indicated by arrow 46. As the valve 16 changes position, an internal flange 44 within the valve 16 moves relative to a lateral extension 42 of the throttle 40. As illustrated, vertical movement of the valve 16 changes the distance between lateral extension 42 and internal flange 44, thereby adjusting a space through which water flows toward the nozzle 12. For instance, the lateral extension 42 of the throttle 40 can be positioned to contact the internal flange 44, such that the pathway is closed and no water flows to the nozzle 12.

As illustrated in FIG. 4, the example throttle 40 has a generally diamond-shaped cross-section. The throttle 40 may include an upper portion located between the lateral extension 42 and the nozzle 12, the upper portion having one or more blades 43. Additionally or alternatively, the throttle 40 may have a lower portion with one or more blades 45. As shown, multiple blades 43 and 45 extend radially from a center of the throttle 40, to facilitate movement of the throttle 40 in response to manipulation of the adjustment bezel 14 and/or to stabilize fluid flow through the valve and bezel.

In the illustrated embodiment, the upper portion has a length measured from the lateral extension 42 that is greater than a length of the lower portion. However, in some examples, the upper portion length is smaller than the lower portion length, whereas in other examples the upper and lower portions have a substantially equal length. As shown, the lateral extension 42 is downstream of the internal flange 44. In other embodiments, the internal flange 44 is downstream of the lateral extension 42.

In the illustrated embodiment, the blades 43 extend radially from the throttle 40 to contact an internal surface (e.g., interior diameter) of one or both of the adjustment bezel 14 or the valve 16. Blades 45 extend radially to contact the inner surface (e.g., interior diameter) of the internal flange 44. However, in some embodiments, one or both of the blades 43,45 do not extend to contact an internal surface, whereas in other embodiments the throttle 40 does not include blades. Further, although illustrated with a substantially diamond-shaped cross-section, the throttle 40 can be defined by any suitable shape (e.g., spherical, triangular, circular, rectangular, etc.) designed to cooperate with the adjustment bezel 14 and valve 16 to change fluid flow. The shape and design of one or more components of the fountain structure 10 (e.g. for aesthetic, technical or design reasons) may also dictate the shape of one or more of the adjustment bezel 14, valve 16 and/or the throttle 40.

Although illustrated as being connected by way of mating threads (e.g., threadably engaged) and rotatable, in some embodiments the bezel 14, valve 16, and/or throttle 40 may be moved by a cam, a lever, gears, a hydraulic device, a motor, or other suitable movement mechanism. In some examples, a remote control can effect adjustment of the valve 16, such as by an electrically controlled motor.

Figure 5:
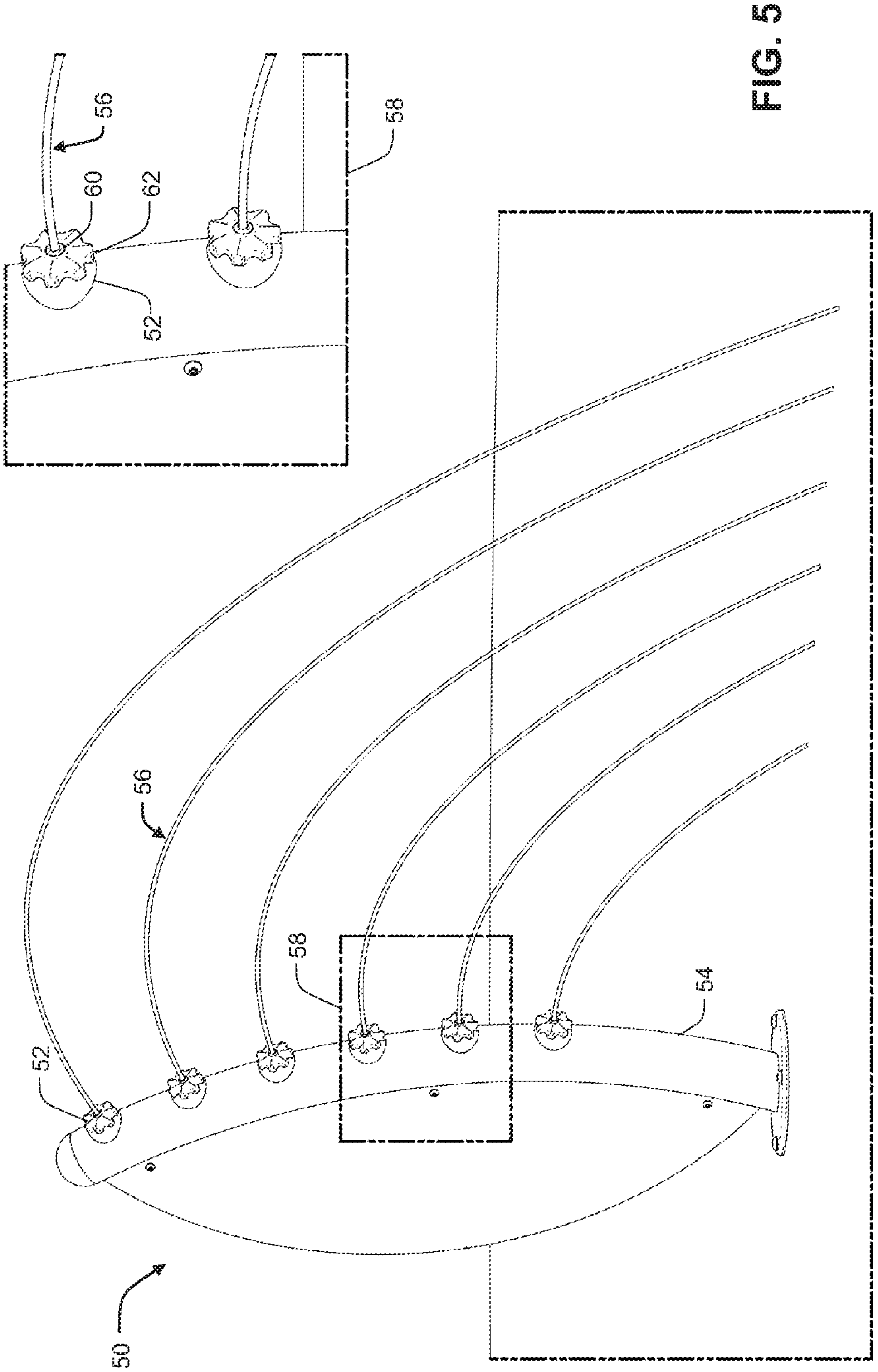
FIG. 5 is a perspective view of another embodiment of a fountain structure of the present disclosure.

FIG. 5 is a perspective view of another embodiment of a fountain structure 50 of the present disclosure. In some embodiments, the fountain structure 50 may be mounted on a frame 54 above ground, such as a play structure for a splash pad or water park setting. For example, the frame 54 may incorporate water inlets, as well as light and/or sound inputs, from conduits below ground, similar to the embodiments described with respect to FIGS. 1-4. In the illustrated embodiment, the frame 54 provides for multiple water outlets or fountains 52, each of which can emit water spray 56.

As shown in the detailed view 58, each water outlet 52 can include a nozzle 60 through which the water spray 56 flows. In some embodiments, a handle or other manipulable device 62 can be formed as an adjustment bezel and/or mechanically coupled to such a bezel. Thus, in a manner similar to the adjustment bezel 14 of FIGS. 1-4, the handle 62 can be engaged with an adjustable valve located within the frame 54. Similarly, rotation or other movement of the handle 62 can cause adjustment to a position of a throttle within the valve, thereby changing water flow through a respective nozzle 60. The result is control over the flow of water through the nozzle 60, which can be used to effect various desired flow patterns even as water flows therefrom. The use of such a regulation mechanism is simple and sturdy, and can therefore be adjusted by a layperson such as a child, which promotes user interaction with the fountains 52 within waterparks In some embodiments, the frame 54 is hollow and fills with water from below ground, such that each fountain 52 draws from the volume of water within. In other examples, a dedicated conduit is run to each fountain 52 to supply water. Further, in some examples, the handle 62 and nozzle 60 may be removed, such as by turning the handle 62 or by use of one or more tools. Once removed, the valve and/or throttle within may be serviced without disassembling the frame 54 thereby simplifying repair of the structure 50, since a non-functioning element may easily be removed and replaced.

In disclosed embodiments, the fountain 50 can be part of an array of fountains linked in a closed circuit. In some embodiments, the closed circuit of fountains may be connected to one or more adjacent fountains in a geometric array, or as desired for a particular waterpark theme.

In general, the fountain structures configured according to the present disclosure may advantageously provide for reduced maintenance and, in turn, lower operating costs. The disclosed fountain structure is readily scalable and may be constructed to have a relatively compact size, depending on a particular application. For example, the fountain structures described herein, when incorporated into larger fountain systems, provide the capability of changing the flow of water for each fountain structure to provide various flow rates, which may be directed through one or more nozzles to adjust a trajectory, direction, and/or patterns, and to provide a controllable, entertaining water fountain with a range of effects.

In some disclosed examples, one or more of the fountain structures can be in communication with one or more controllers (or computer system) that are electrically coupled to pumps or motors to control fluid flow, light assembly operation, and/or synchronized music sources. The controller may include, for example, one or more computing platforms or processors, capable of accepting and controlling a programmable logic routine.

Additionally, the components of fountain structures disclosed herein may be made from a wide variety of materials. For example, metals, stainless steel, plated steel, composite materials, plastics or other polymers, to list but a few possible options.

It can be seen that the described embodiments provide unique and novel fountain adjustment systems and methods that have a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A fountain structure comprising:

a. a housing for placement within an opening;

b. a cover to enclose the housing within the opening, the cover comprising an exposed surface when enclosing the housing;

c. an adjustable valve to change a flow of fluid from the fountain structure, the valve being enclosed within the housing; and d. an adjustment bezel arranged downstream of the valve, the bezel comprising a first portion and a second portion, the first and second portions configured to move in response to a manipulation of the adjustment bezel, and the second portion enclosed within the housing and configured to engage with the valve;

wherein movement of the bezel causes a change in a position of the valve along a central axis relative to the bezel and a throttle to change the flow of fluid, and wherein a position of the adjustment bezel along the central axis is fixed relative to the cover and the bezel rotates with respect to the cover, and wherein the throttle is partially arranged within the bezel and the valve.

2. The fountain structure of claim 1, wherein the valve is threadably engaged with the second portion of the bezel at a first end of the valve and threadably engaged with a fluid inlet at a second end of the valve.

3. The fountain structure of claim 2, wherein the throttle is further configured to change flow of the fluid based on a positon of the throttle relative to the valve.

4. The fountain structure of claim 3, wherein the first portion of the bezel is configured to rotate about the central axis, wherein rotational movement of the first portion of the bezel causes the valve position to change along the central axis relative to the throttle to change the flow of the fluid.

5. The fountain structure of claim 1, wherein the bezel and the valve are substantially cylindrical.

6. The fountain structure of claim 1, further comprising a nozzle located at the output of the valve, the nozzle configured to direct the fluid flowing from the valve in a predetermined pattern.

7. The fountain structure of claim 6, wherein the nozzle, the bezel, the cover, and the valve are aligned with the central axis.

8. The fountain structure of claim 1, wherein the bezel is positioned inside a bore at the exposed surface of the cover, and the opening is recessed within an underlying structure such that the exposed surface of the cover is mounted flush with a surface of the underlying structure when enclosing the housing.

9. The fountain structure of claim 1, wherein the first portion of the bezel is manually rotatable or rotatable by employing a tool.

10. The fountain structure of claim 9, wherein the first portion of the bezel further comprises one or more mating features configured to facilitate rotation via the tool.

11. The fountain structure of claim 1, wherein the first portion is at least partially exposed on the surface of the cover.

12. The fountain structure of claim 1, wherein the cover comprises an aperture through which the first portion is at least partially exposed below the surface of the cover.

13. The fountain structure of claim 1, wherein the cover is removable from the fountain structure, the first portion at least partially enclosed when the cover is in place on the fountain structure, and the first portion is at least partially exposed when the cover is removed.

14. The fountain structure of claim 1, wherein the opening is located under a play surface and the cover is substantially flush with the play surface.

15. The fountain structure of claim 1, wherein the valve includes an internal flange extending inward toward the central axis, the throttle including at least one lateral extension extending outward from the central axis, wherein movement of the valve along the central axis changes a distance between the at least one lateral extension and the internal flange, thereby adjusting a space through which water flows through the bezel.

16. A method of providing a fountain comprising one or more fountain structures of claim 1 having substantially the same fluid flow, the method comprising:

providing the one or more fountain structures of claim 1; and independently adjusting the flow of fluid from the one or more fountain structures by operation of the adjustment bezels of the one or more fountain structures.

17. A fountain structure comprising:

a. a cylindrical adjustable valve operable to change a flow of fluid from the fountain structure, the valve being enclosed within a housing by a cover; and b. an adjustment bezel arranged downstream of the valve, the bezel comprising a first portion and a second portion, the first and second portions configured to move in response to a manipulation of the adjustment bezel, and the second portion enclosed within the housing and configured to engage with the valve; and c. a throttle arranged within the adjustable valve and the adjustment bezel, wherein movement of the bezel causes an up or down change in a position of the valve along a central axis relative to the bezel and the throttle to change the flow of fluid, and wherein a position of the adjustment bezel along the central axis is fixed relative to the cover and the bezel rotates with respect to the cover, and wherein the throttle is partially arranged within the bezel and the valve.

18. The fountain structure of claim 17, wherein the valve includes an internal flange extending inward toward the central axis, wherein the throttle includes at least one lateral extension extending outward from the central axis, the internal flange configured to contact the at least one lateral extension.

19. The fountain structure of claim 18, wherein movement of the valve along the central axis changes a distance between the at least one lateral extension and the internal flange, thereby adjusting a space through which water flows through the bezel.

20. The fountain structure of claim 17, wherein the valve is threadably engaged with the adjustment bezel at a first end of the valve and threadably engaged with a fluid inlet at a second end of the valve.

* * * * *